United States Patent [19]

Umney et al.

[11] Patent Number: 5,470,114
[45] Date of Patent: Nov. 28, 1995

[54] COUPLING ASSEMBLY

[75] Inventors: Michael A. Umney, Mason, Ohio; Steven A. Walters, Canton, Mich.; Christopher R. Koss, West Chester, Ohio

[73] Assignee: General Electric Company, Cincinnati, Ohio

[21] Appl. No.: 338,063

[22] Filed: Nov. 14, 1994

[51] Int. Cl.⁶ .................................................. F16L 17/06
[52] U.S. Cl. .......................... 285/367; 285/347; 285/910
[58] Field of Search ................................. 285/363, 364, 285/365, 366, 367, 368, 347, 910

[56] References Cited

U.S. PATENT DOCUMENTS

| | | | |
|---|---|---|---|
| 1,816,293 | 7/1931 | Oberhuber | 285/368 X |
| 2,729,237 | 1/1956 | Hite | 285/367 X |
| 2,773,709 | 12/1956 | Smith | 285/367 X |
| 3,007,600 | 11/1961 | Horner | 285/918 |
| 3,029,095 | 4/1962 | King et al. | 285/367 X |
| 3,554,581 | 1/1971 | Mason et al. | 285/367 |
| 3,712,631 | 1/1973 | Forchini et al. | 277/207 |
| 3,986,732 | 10/1976 | Stanley | 285/281 X |
| 4,443,029 | 4/1984 | Laxo | 285/367 X |
| 4,615,547 | 10/1986 | Sutcliffe et al. | 285/281 X |
| 4,844,515 | 7/1989 | Field | 285/305 |
| 4,850,621 | 7/1989 | Umehara | 285/322 |
| 4,934,742 | 6/1990 | Williamson | 285/212 |
| 5,040,714 | 8/1991 | McManigal | 277/1 |
| 5,308,125 | 5/1994 | Anderson, Jr, | 285/349 |

FOREIGN PATENT DOCUMENTS

| | | | |
|---|---|---|---|
| 4105206 | 8/1992 | Germany | 285/365 |
| 267519 | 9/1929 | Italy | 285/363 |
| 162320 | 2/1958 | Sweden | 285/57 |
| 671466 | 5/1952 | United Kingdom | 285/57 |

OTHER PUBLICATIONS

SAE, "Coupling Assembly, V–Retainer, High Pressure, High Temperature, Pneumatic Tube," Feb. 1988, Aerospace Standard AS1895, pp: Cover and 1–3 & 7.
USAF, "Seal, Plain Rubber (–65 to +160 Deg. F Fuel Resistant), Mold in Groove," MS27194(USAF), one page.
USG, "Flange, Swivel, Retaining," MS20756, Aug. 1957, pp: 1–3 & sketch.

Primary Examiner—Dave W. Arola
Attorney, Agent, or Firm—Andrew C. Hess; Patrick R. Scanlon

[57] ABSTRACT

A coupling assembly for fluid carrying tubes in a gas turbine engine include first and second fittings fixedly joined to respective ones of the tubes. The first and second fittings include respective first and second mating flanges which are joined together by a clamping band which is adjustable therearound. The first and second flanges include oppositely facing first and second flat faces, with the first flange having a counterbore extending inwardly from the first face, and the second flange having a pilot tube extending outwardly therefrom for being inserted into the counterbore. An annular seal is disposed between the first and second fittings for providing a leak-proof coupling upon clamping together of the two fittings by the clamping band.

10 Claims, 2 Drawing Sheets

COUPLING ASSEMBLY

The present invention relates generally to gas turbine engines, and, more specifically, to tube couplings therein.

BACKGROUND OF THE INVENTION

Gas turbine engines include various pipes or tubes therein for channeling bleed air, fuel, and oil. Since fuel and oil are flammable, suitable couplings must be provided for joining together the various tubes without leaking thereof. A typical leak-proof coupling includes a pair of mating annular flanges welded to adjoining tube ends with the flanges having a plurality of fastener holes around the circumferences thereof. A suitable annular gasket is disposed between these mating flanges, and fasteners extend through the respective holes for clamping together the two mating flanges and compressing therebetween the gasket for maintaining a leak-proof coupling. These couplings, however, increase the time required during initial assembly and during maintenance since the mating flanges must be properly aligned together and the several fasteners must be installed or removed.

Another type of coupling found in gas turbine engines includes a pair of mating flanges and a V-shaped clamping band having a single, tangential fastener which is suitably tightened for clamping together the two mating flanges of adjoining tube ends. One of the mating flanges typically includes an axially projecting rib which abuts the mating flange and radially below which is disposed a metal seal of various configurations including "C," "V," and "E" shaped configurations. This type of seal is used in bleed air systems which extract relatively hot compressed air from the compressor of the engine and channel it through the engine for various conventional purposes. These seals are not considered leak-proof, but the slight leakage thereof of compressed air does not present the concern associated with the leakage of a flammable fluid such as fuel or oil in the environment of a gas turbine engine. The V-band couplings, however, provide easy assembly and disassembly of the couplings which is desirable for maintenance purposes.

SUMMARY OF THE INVENTION

A coupling assembly for fluid carrying tubes in a gas turbine engine include first and second fittings fixedly joined to respective ones of the tubes. The first and second fittings include respective first and second mating flanges which are joined together by a clamping band which is adjustable therearound. The first and second flanges include oppositely facing first and second flat faces, with the first flange having a counterbore extending inwardly from the first face, and the second flange having a pilot tube extending outwardly therefrom for being inserted into the counterbore. An annular seal is disposed between the first and second fittings for providing a leak-proof coupling upon clamping together of the two fittings by the clamping band.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
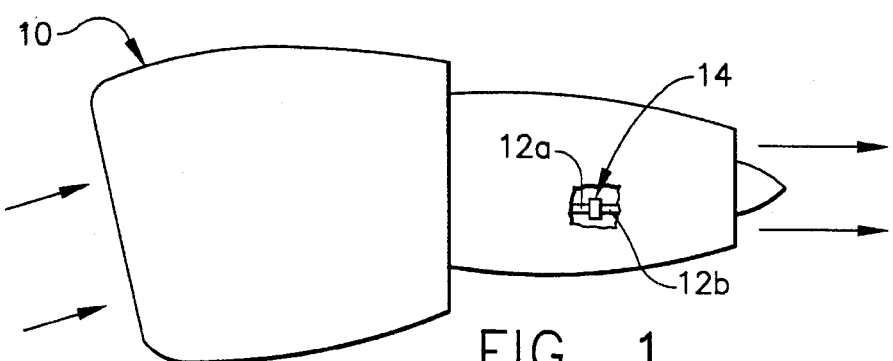
FIG. 1 is a side view of an exemplary gas turbine engine having an exemplary tube therein for carrying a flammable fluid, with the tube having a coupling in accordance with one embodiment of the present invention.

Illustrated in FIG. 1 is an exemplary gas turbine engine 10 having a fan, core engine, and power turbine for powering the fan to provide propulsion thrust for powering an aircraft in flight. The engine 10 includes various tubes for carrying compressor bleed air, fuel, and lubricating oil which must be suitably joined together at various coupling joints for providing assembly and disassembly of components. For example, portions of first and second fluid carrying tubes 12a and 12b are illustrated and are joined together by a leakproof coupling assembly 14 in accordance with the present invention. The tubes 12a,b are conventionally configured for carrying a flammable fluid F, as shown in more particularity in FIG. 2, in the engine 10 and, therefore, the coupling assembly 14, or simply coupling 14 is configured in accordance with the present invention for providing a leak-proof joint which may be readily assembly or disassembled during a maintenance outage.

Figure 2:
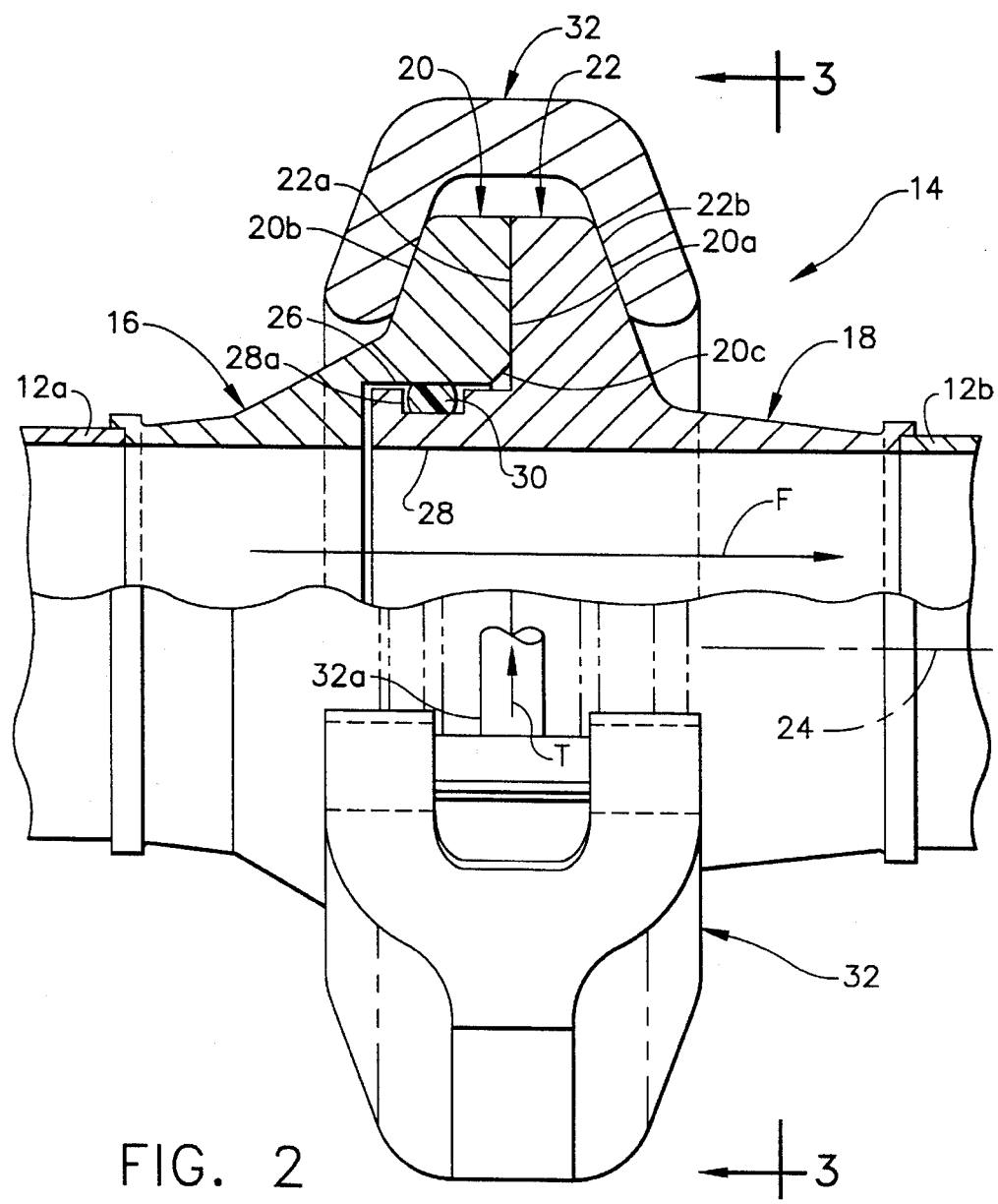
FIG. 2 is a partly sectional, elevational view of the coupling assembly illustrated in FIG. 1 in accordance with one embodiment thereof and includes a clamping band therearound for joining together mating fittings.

FIG. 2 illustrates an exemplary embodiment of the coupling 14 for sealingly coupling adjoining ends of the tubes 12a,b. The coupling 14 includes a first tubular fitting 16 which is fixedly and sealingly joined at a proximal end thereof to a respective end of the first tube 12a by welding for example. A second tubular fitting 18 is similarly fixedly and sealingly joined at a proximal end thereof to a respective end of the second tube 12b by welding for example.

The first fitting 16 includes a first annular mating flange 20 at a distal end thereof which correspondingly mates with a second annular mating flange 22 at a distal end of the second fitting 18.

The first flange 20 includes a radially extending annular first flat face 20a which is disposed perpendicularly to an axial centerline axis 24 of the assembled coupling 14. The first flange 20 further includes an annular first inclined face 20b on an opposite side thereof which is frustoconical with a diameter increasing as it approaches the first flat face 20a. A counterbore 26 extends axially inwardly from the first face 20a, and coaxially therewith into the first fitting 16.

The second mating flange 22 includes a radially extending annular second flat face 22a on one side thereof, and an annular second inclined face 22b on an opposite side thereof disposed coaxially about the centerline axis 24. The second flat face 22a extends perpendicularly to the centerline axis 24 and is complementary in configuration to the first flat face 20a for coextensively facing the first flat face 20a. The second inclined face 22b is also frustoconical and has a diameter increasing as it approaches the second flat face 22a and faces axially oppositely to the first inclined face 20b, with the first and second inclined faces 20b, 22b converging together in the radially outward direction.

The second mating flange 22 further includes a pilot tube 28 extending axially outwardly from the second flat face 22a and coaxially therewith, and is complementary in configuration to the counterbore 26 for being axially inserted and disposed therein upon assembly of the first and second fittings 16, 18. The outer diameter of the pilot tube 28 is suitably less than the inner diameter of the counterbore 26 for providing a slight clearance therebetween, with the pilot tube 28 ensuring accurate alignment between the two fittings 16, 18 when assembled.

Figure 3:
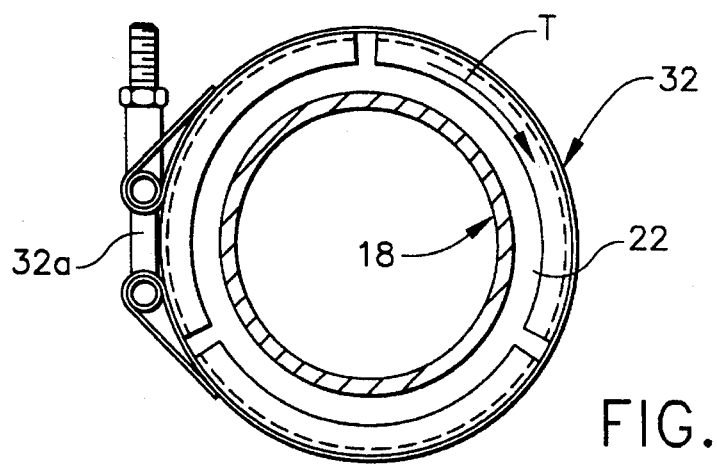
FIG. 3 is a partly sectional, elevational view of the coupling assembly illustrated in FIG. 2 and taken along line 3—3.

An annular elastomeric seal 30 in the form of a conventional O-ring is disposed between the first and second fittings 16, 18 for effecting a sealed joint therebetween. A conventional clamping band 32 has a generally V-shaped cross section which is complementary in configuration with the first and second inclined faces 20b, 22b when the first and second fittings 16, 18 are assembled together. Referring to both FIGS. 2 and 3, the band 32 is configured to extend circumferentially around the first and second flanges 20, 22 and conventionally includes one or more slots around the circumference thereof for providing a suitable degree of radial flexibility for allowing the band 32 to be assembled around the first and second flanges 20, 22. The band 32 includes a conventional adjustable fastener 32a which is tangentially extending and is conventionally effective for generating hoop tension T in the band 32 for axially clamping together the first and second flanges 20, 22.

FIG. 2 illustrates one embodiment of the coupling 14 wherein the pilot tube 28 includes a recess 28a having a generally rectangular cross section which extends circumferentially around the pilot tube 28 and faces radially outwardly toward the inner surface of the counterbore 26. The seal 30 is in the exemplary form of an O-ring disposed in the recess 28a, with the seal 30 having an initially undistorted or uncompressed circular cross section. The recess 28a is sized for receiving the seal 30, with the seal 30 having an initial, uncompressed outer diameter which is suitably larger than the inner diameter of the counterbore 26. Accordingly, upon insertion of the pilot tube 28 axially into the counterbore 26 the initially larger seal 30 is suitably compressed and flattened into an oblong cross section as illustrated in FIG. 2 for providing an effective sealing joint between the counterbore 26 and the pilot tube 28.

The first and second faces 20a and 22a are flat in this embodiment so that the axially directed forces generated by tightening the band 32 against the first and second inclined faces 20b, 22b are effective for clamping directly together the first and second flat faces 20a, 22a in abutting contact. The distal end of the pilot tube 28 is preferably spaced away from the bottom step of the counterbore 26 to provide a suitable clearance therebetween for ensuring axial load transfer solely through the abutting first and second flat faces 20a, 22a. The pilot tube 28 is disposed perpendicularly to the second flat face 22a so that solely axial forces are carried between the abutting first and second mating flanges 20, 22. And, by preferably locating the seal 30 around the pilot tube 28, it provides a barrier to the high pressure fluid F being channeled through the tubes 12a, 12b. In this way, no fluid pressure forces reach the first and second flat faces 20a, 22a, and therefore do not generate axially directed pressure forces thereat which would otherwise have to be accommodated by the clamping band 32.

As shown in FIG. 2, the first flange 20 preferably also includes an annular chamfer 20c disposed between the first flat face 20a and the counterbore 26 at the intersection thereof for initially radially inwardly compressing or guiding the seal 30 into the counterbore 26 upon insertion of the pilot tube 28 therein. Since the coupling 14 is being configured for carrying a flammable fluid F which may include either fuel or oil in a gas turbine engine 10, the seal 30 is formed of a suitable material chemically resistant to the flammable fluid F for effecting a leak-proof coupling between the first and second fittings 16, 18 which has a useful life in the hostile environment of the gas turbine engine 10. Exemplary seal materials include fluorocarbon and fluorosilicone.

Accordingly, the coupling 14 disclosed above provides an effective leak-proof seal 10 joint between the mating first and second fittings 16, 18, while allowing improved maintainability since the conventional clamping band 32 may be used for quickly and easily assembling and disassembling the coupling 14.

Figure 4:
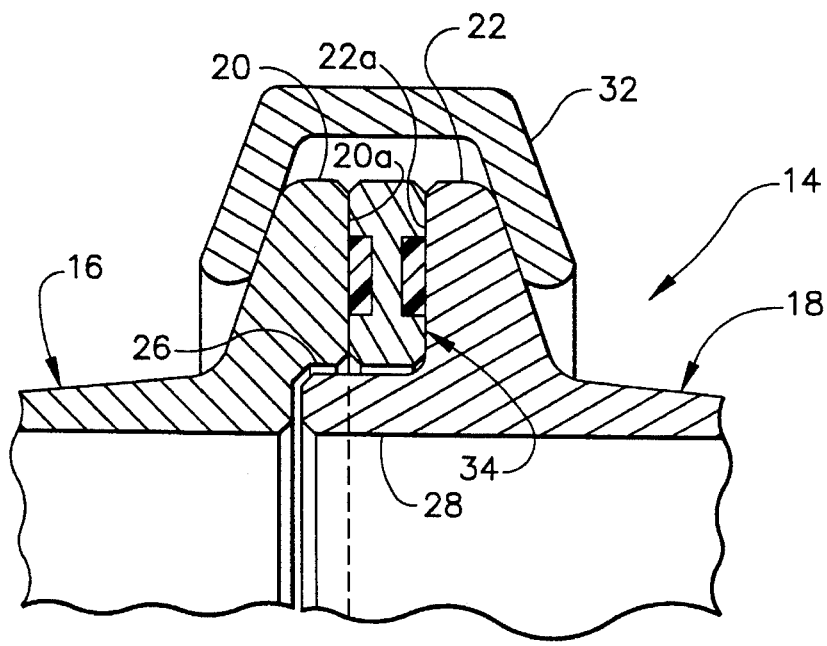
FIG. 4 is an axial sectional view of a portion of a coupling assembly in accordance with another embodiment.
Figure 5:
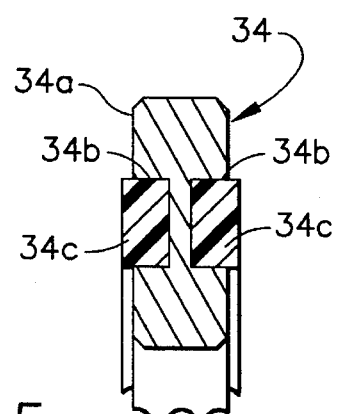
FIG. 5 is an enlarged sectional view of a portion of the seal used in the coupling assembly illustrated in FIG. 4.

Illustrated in FIGS. 4 and 5 is an alternate embodiment of the coupling 14 wherein the pilot tube 28 has an imperforate outer surface without the recess 28a therein and functions for piloting the second fitting 18 into the counterbore 26 of the first fitting 16, and for supporting an alternate embodiment of the seal, designated 34. In this embodiment, the seal 34 includes a rigid annular frame 34a of aluminum or steel for example which is sized to fit between the first and second flat faces 20a, 22a and around the pilot tube 28. The frame 34a has a generally I-beam shape defined by a pair of identical annular, generally rectangular in cross section cavities 34b on opposite sides thereof. A pair of elastomeric seal rings 34c are disposed in respective ones of the cavities 34b for contacting the first and second flat faces 20a, 22a to effect seals therewith upon clamping together of the first and second fittings 16, 18 by the band 32.

As shown in FIG. 5, the seal rings 34c are sized to initially extend outwardly from the frame 34a and are compressible into the cavities 34b by the first and second flat faces 20a, 22a upon tightening of the band 32. The frame 34a is preferably rigid for limiting compression of the seal rings 34c and travel of the pilot tube 28 into the counterbore 26. In this way, the band 32 exerts axial force on the first and second axial flanges 20, 22 to compress the seal rings 34c into the frame 34a until the frame 34a prevents further axial travel of the respective mounting flanges 20, 22. A suitable clearance is provided between the distal end of the pilot tube 28 and the bottom step of the counterbore 26 to ensure effective compression of the seal rings 34c.

In this embodiment also, the fluid F being sealed within the coupling 14 is flammable such as fuel or oil, and therefore seal rings 34c are made of a suitable material such as fluorocarbon or fluorosilicone. Since the seal 34 is disposed between the first and second flat faces 20a, 22a in this embodiment, pressure forces from the fluid F within the coupling 14 are carried through the space between the counterbore 26 and the pilot tube 28 and must be suitably accommodated by the clamping band 32. This requires a stronger band 32 with increased circumferential hoop loads therein for effecting axial clamping forces on the mating flanges 20, 22 to accommodate the internal pressure within the coupling 14 as well as for providing effective sealing between the flanges 20, 22.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention. For example, the coupling assembly may include both sealing arrangements disclosed above.

Accordingly, what is desired to be secured by Letters Patent of the United States is the invention as defined and differentiated in the following claims:

1. A gas turbine engine assembly for sealingly coupling adjoining ends of first and second fluid carrying tubes in a gas turbine engine comprising:

a first tubular fitting fixedly joinable at a proximal end to said first tube, and having a first annular mating flange at a distal end thereof;

said first mating flange including an annular first flat face on one side thereof extending radially outwardly to a perimeter of said first mating flange, and an annular first inclined face on an opposite side thereof, and a counterbore extending inwardly from said first flat face into said first fitting;

a second tubular fitting fixedly joinable at a proximal end to said second tube, and having a second annular mating flange at a distal end thereof;

said second mating flange including an annular second flat face on one side thereof extending radially outwardly to a perimeter of said second mating flange being complementary to said first flat face for facing said first flat face, an annular second inclined face on an opposite side thereof, and a pilot tube extending outwardly directly from said second flat face and being complementary to said counterbore for being disposed therein;

an annular elastomeric seal being disposable between said first and second fittings; and a clamping band having a generally V-shaped cross section complementary in configuration with said first and second inclined faces when said first and second fittings are assembled together, and including an adjustable fastener for effecting hoop tension in said band for axially clamping together said first and second flanges by axially directed forces generated by tightening said band against said first and second inclined faces to effect a leak-proof coupling between said first and second fittings in said gas turbine engine, with a distal end of said pilot tube being spaced away from a bottom step of said counterbore to provide a clearance therebetween.

2. A coupling assembly according to claim 1 wherein:

said pilot tube includes a recess extending circumferentially therearound and facing radially outwardly toward said counterbore;

said seal is in the form of an O-ring disposed in said recess, said seal and said recess being sized for compressing said seal upon insertion of said pilot tube into said counterbore; and said band being effective for clamping directly together said first and second flat faces in abutting contact.

3. A coupling assembly according to claim 2 wherein said first flange includes an annular chamfer disposed between said first flat face and said counterbore for initially compressing said seal upon insertion of said pilot tube into said counterbore.

4. A coupling assembly according to claim 3 wherein said pilot tube is disposed perpendicularly to said second flat face.

5. A coupling assembly according to claim 4 wherein said tubes are configured for carrying a flammable fluid including fuel or oil in said gas turbine engine, and said seal is formed of a material resistant to said fluid for effecting said leak-proof coupling between said first and second fittings.

6. A coupling assembly according to claim 1 wherein said seal comprises:

an annular frame sized to fit between said first and second flat faces and around said pilot tube;

said frame including a pair of annular cavities on opposite sides thereof; and a pair of elastomeric seal rings disposed in respective ones of said cavities for contacting said first and second flat faces to effect seals therewith upon clamping together of said first and second fittings by said band.

7. A coupling assembly according to claim 6 wherein said seal rings are sized to initially extend outwardly from said frame and are compressible into said cavities by said first and second flat faces upon tightening of said band, with said frame being rigid for limiting compression of said seal rings and travel of said pilot tube into said counterbore.

8. A coupling assembly according to claim 7 wherein said pilot tube has an imperforate outer surface.

9. A coupling assembly according to claim 7 wherein said pilot tube is disposed perpendicularly to said second flat face.

10. A coupling assembly according to claim 7 wherein said tubes are configured for carrying a flammable fluid including fuel or oil in said gas turbine engine, and said seal ring is formed of a material resistant to said fluid for effecting said leak-proof coupling between said first and second fittings.

* * * * *